US010086513B2

(12) United States Patent
Park et al.

(10) Patent No.: US 10,086,513 B2
(45) Date of Patent: Oct. 2, 2018

(54) WEARABLE ROBOT DEVICE AND METHOD OF CONTROLLING THE WEARABLE ROBOT DEVICE

(71) Applicant: HYUNDAI MOTOR COMPANY, Seoul (KR)

(72) Inventors: Jung Mi Park, Anyang-si (KR); Hyunjin Kang, Seoul (KR); Jimin Han, Anyang-si (KR); Jia Lee, Goyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 9 days.

(21) Appl. No.: 15/183,144

(22) Filed: Jun. 15, 2016

(65) Prior Publication Data

US 2017/0165833 A1 Jun. 15, 2017

(30) Foreign Application Priority Data

Dec. 14, 2015 (KR) ........................ 10-2015-0177885

(51) Int. Cl.
| | |
|---|---|
| *B25J 9/16* | (2006.01) |
| *A61H 3/00* | (2006.01) |
| *G01L 5/00* | (2006.01) |
| *B25J 9/00* | (2006.01) |
| *B25J 13/08* | (2006.01) |
| *B25J 13/00* | (2006.01) |

(52) U.S. Cl.
CPC .............. *B25J 9/1633* (2013.01); *A61H 3/00* (2013.01); *B25J 9/0006* (2013.01); *B25J 13/085* (2013.01); *G01L 5/0028* (2013.01); *A61H 3/008* (2013.01); *B25J 13/003* (2013.01); *B25J 13/084* (2013.01); *G01L 5/0061* (2013.01); *G05B 2219/40413* (2013.01); *G05B 2219/40414* (2013.01)

(58) Field of Classification Search
CPC ...... A61H 3/00; A61H 3/008; A61H 2230/00; B25J 9/0006; B25J 9/1633; B25J 13/003; B25J 13/084; B25J 13/085; G01L 5/0028; G01L 5/0061; G05B 2219/40413; G05B 2219/40414
See application file for complete search history.

(56) References Cited

U.S. PATENT DOCUMENTS

| | | | |
|---|---|---|---|
| 2012/0010749 A1* | 1/2012 | van der Merwe | ........ A61F 2/54 700/264 |
| 2013/0173058 A1* | 7/2013 | Seo | ........ G05B 15/00 700/260 |

(Continued)

FOREIGN PATENT DOCUMENTS

| | | |
|---|---|---|
| JP | 07-251394 A | 10/1995 |
| JP | 2007-097636 A | 4/2007 |

(Continued)

*Primary Examiner* — Jason Holloway
(74) *Attorney, Agent, or Firm* — McDermott Will & Emery LLP

(57) ABSTRACT

A wearable robot device includes a frame, a detector provided on the frame for collecting information on a force applied from a user, a controller for determining a required amount of torque necessary for an operation of the wearable robot device based on the information collected by the detector, and for determining a sound corresponding to the required amount of torque, and an output unit for outputting the determined sound.

11 Claims, 6 Drawing Sheets

(56) References Cited

U.S. PATENT DOCUMENTS

| | | | | |
|---|---|---|---|---|
| 2014/0212243 A1* | 7/2014 | Yagi | ........................ | A61H 3/00 |
| | | | | 414/2 |
| 2015/0119996 A1* | 4/2015 | Choi | ........................ | A61F 2/68 |
| | | | | 623/24 |
| 2015/0127018 A1* | 5/2015 | Lim | ........................ | A61H 3/00 |
| | | | | 606/130 |
| 2015/0224013 A1* | 8/2015 | Kwon | .................. | A61H 1/0262 |
| | | | | 482/51 |

FOREIGN PATENT DOCUMENTS

| | | |
|---|---|---|
| JP | 2009-060946 A | 3/2009 |
| JP | 2011-251057 A | 12/2011 |
| JP | 2013-529937 A | 7/2013 |
| KR | 10-2007-0061078 A | 6/2007 |
| KR | 10-2014-0014695 A | 2/2014 |

\* cited by examiner

WEARABLE ROBOT DEVICE AND METHOD OF CONTROLLING THE WEARABLE ROBOT DEVICE

CROSS-REFERENCE TO RELATED APPLICATION

This application claims the benefit of priority to Korean Patent Application No. 10-2015-0177885, filed on Dec. 14, 2015 with the Korean Intellectual Property Office, the disclosure of which is incorporated herein by reference.

TECHNICAL FIELD

Embodiments of the present disclosure relate to a wearable robot device having an audible feedback function and a method of controlling the wearable robot device.

BACKGROUND

Wearable robot devices may be used, according to application fields, as assistant devices to assist muscle power, or augmenting devices to augment a user's muscle power for carrying an object having a heavy weight.

In such wearable robot devices, a simple method of guiding a corresponding user through a visual display is generally used to notify the user of the total amount of an augmented force and real time changes in the augmented physical force. However, there is a problem in that it is difficult for the user to know the amount and the change when the user does not directly look at the amount and the change, and even when the user looks at numbers corresponding to the physical amount of the force, the user may not easily understand their meaning.

SUMMARY

Therefore, it is an aspect of the present disclosure to provide a wearable robot device and a method of controlling the same which provide a different audible feedback according to an operation of the wearable robot device.

It is another aspect of the present disclosure to provide a wearable robot device and a method of controlling the same which provide an audible feedback corresponding to a power augmented by the wearable robot device.

Additional aspects of the disclosure will be set forth in part in the description which follows and, in part, will be obvious from the description, or may be learned by practice of the disclosure.

In accordance with one aspect of the present disclosure, a wearable robot device may include a frame, a detector provided on the frame and configured to collect information on a force applied from a user, a controller configured to determine a required amount of torque necessary for an operation of the wearable robot device based on the information collected by the detector, and configured to determine a sound corresponding to the required amount of torque, and an output unit configured to output the determined sound.

The controller may determine a frequency, strength, and a tone of the sound according to the determined required amount of torque.

The output unit may output a sound having a different frequency, strength, and tone according to the determined required amount of torque.

The output unit may output a sound having a different frequency, strength, and tone according to an operation mode of the wearable robot device.

The output unit may output a preset sound in a first frequency band when the wearable robot device is operated in a first operation mode, and a sound of a predetermined second frequency band when the wearable robot device operates in a second operation mode.

The wearable robot device may further include an input unit configured to receive an operation mode of the wearable robot device.

The wearable robot device may further include a memory which information on a target value of a force according to an operation mode of the wearable robot device is stored.

The controller may determine the required amount of torque necessary for the operation of the wearable robot device based on a difference between the information on the target value of the force stored in the memory and the information on the force of the user collected in the detector.

The memory may store information on a frequency, strength, and a tone of the sound which is output from the output unit according to the required amount of torque.

The detector may be provided at an end point of the wearable robot device.

The detector may include a force sensor to collect the information on the force of the user.

In accordance with another aspect of the present disclosure, a method of controlling the wearable robot device includes collecting force information of a user in a detector, determining a required amount of torque necessary for an operation of the wearable robot device based on the forcer information, determining a sound corresponding to the required amount of torque, and outputting the determined sound.

The step for determining the sound corresponding to the determined required amount of torque may include determining a frequency, strength, and a tone of the sound according to the determined required amount of torque.

The step for outputting the determined sound may include outputting a sound having a different frequency, strength, and tone according to the determined required amount of torque.

The step for outputting the determined sound may include outputting a sound having a different frequency, strength, and tone according to an operation mode of the wearable robot device.

The step for outputting the determined sound may include outputting a preset sound infirst frequency band when the wearable robot device operatesin a first operation mode, and outputting a preset sound ina second frequency band when the wearable robot device operatesin a second operation mode.

A method of controlling the wearable robot device may include setting an operation mode of the wearable robot device.

The determining of the required amount of torque necessary for the operation of the wearable robot device may include determining the required amount of torque necessary for the operation of the wearable robot device based on a difference between a target value of a force stored in a memory and the force information of the user collected by the detector.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
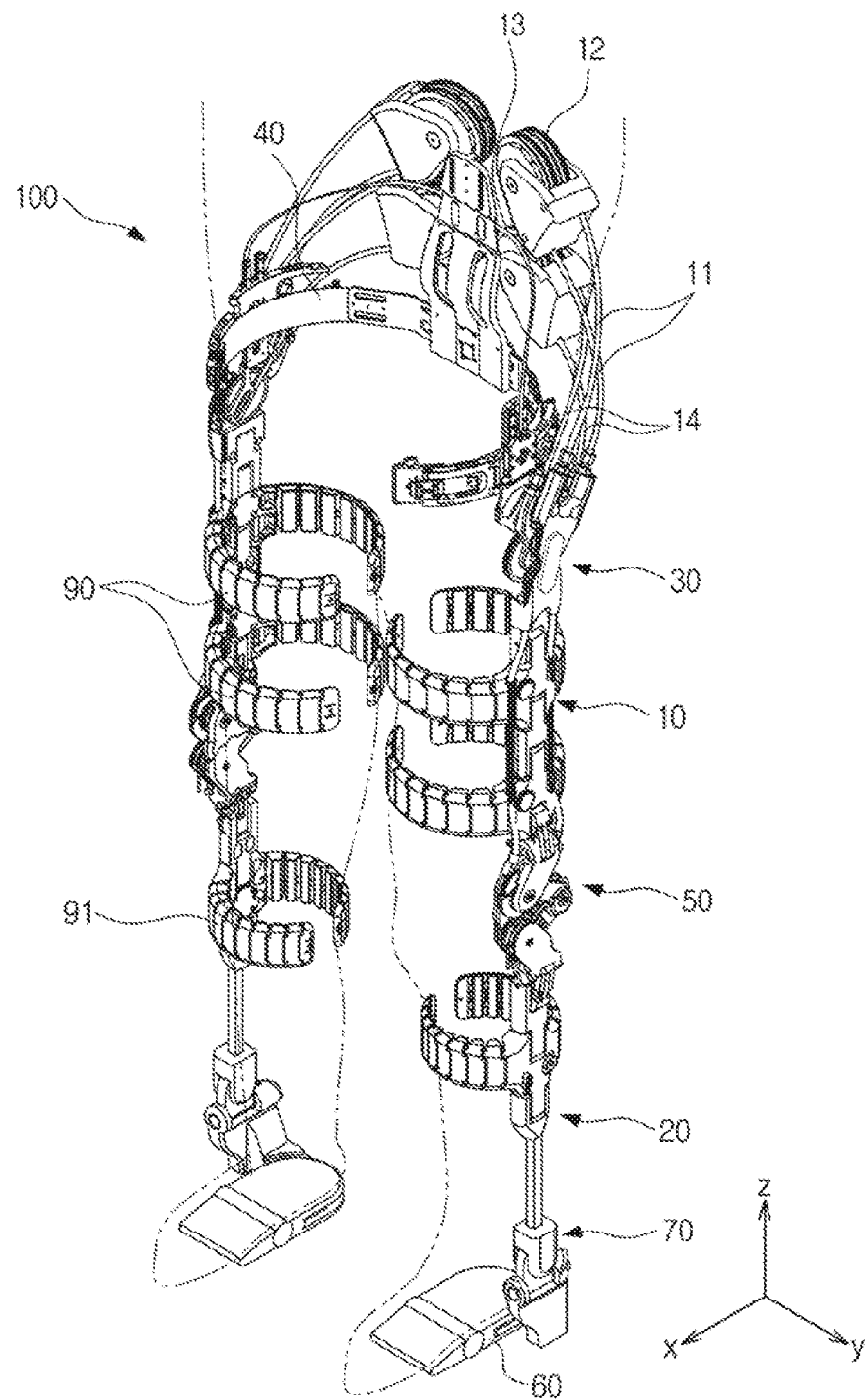
FIG. 1 is a view illustrating an exterior of a wearable robot device according to one embodiment of the present disclosure.

Reference will now be made in detail to the embodiments of the present disclosure, examples of which are illustrated in the accompanying drawings, wherein like reference numerals refer to like elements throughout.

Hereinafter, a wearable robot device and a method of controlling the wearable robot device will be described with reference to the accompanying drawings.

The wearable robot device according to the disclosure is provided to be wearable by a user. Hereinafter, the wearable robot device may be defined as a concept including a walking assist device which assists a handicapped user in walking, a muscle power augmenting device provided to assist a muscle power of a worker at a work site, etc.

Figure 2:
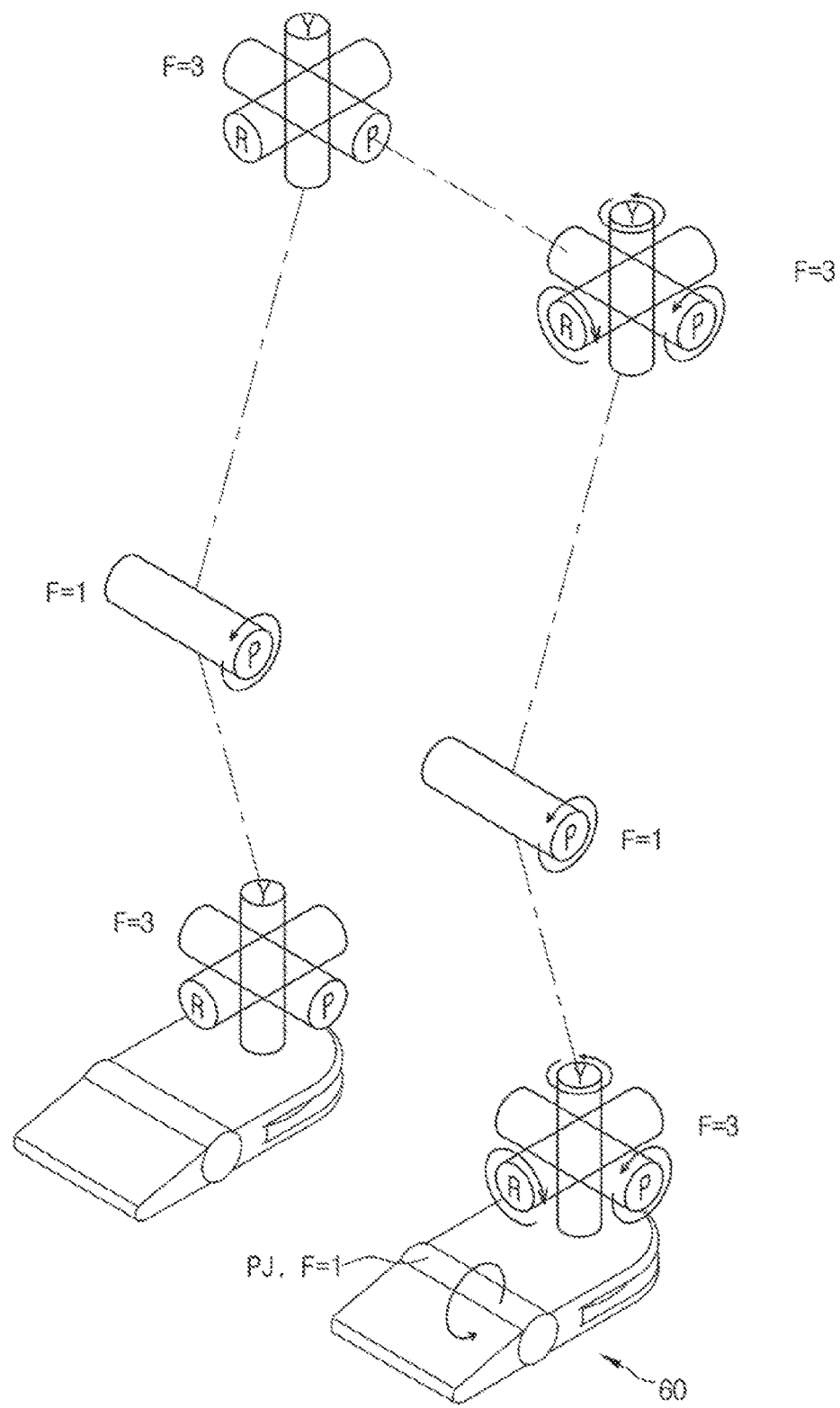
FIG. 2 is a view illustrating degrees of freedom of the wearable robot device according to one embodiment of the present disclosure.

FIG. 1 is a view illustrating a wearable robot device according to one embodiment of the present disclosure, and FIG. 2 is a view illustrating degrees of freedom of a wearable robot device according to one embodiment of the present disclosure.

Referring to FIG. 1, a wearable robot device 100 according to one embodiment may include frames 10 and 20 which extend in a longitudinal direction of the feet of a user and support the weight of the user. The frames 10 and 20 may include a first frame 10 which supports the thigh of the user and a second frame 20 which supports the calf of the user.

The first frame 10 may be pivotally connected to a waist fixing part 40 by a hip joint 30. The first frame 10 and the second frame 20 may be pivotally connected by a knee joint 50. The second frame 20 may be connected to a foot structure 60 fixed on the foot of the user. The second frame 20 and the foot structure 60 may be pivotally connected by an ankle joint 70.

The wearable robot device 100 may further include a driving source which provides the hip joint 30 and the knee joint 50 with a driving force and a controller which controls an operation of the wearable robot device 100. The foot structure 60 may be provided with a sensor, and information on an activity of the user sensed by the sensor may be transmitted to the controller. The controller may control an operation of the hip joint 30 or the knee joint 50 using the transmitted information. The wearable robot device 100 may further include a driving source which provides the ankle joint 70 with a driving force.

Referring to FIG. 2, the first frame 10 may be pivoted to have 3 degrees of freedom with respect to the hip joint 30. An operation of 3 degrees of freedom may be performed by a transferred driving force or no driving force. As an example, although one operation of 1 degree of freedom in which the first frame 10 is pivoted based on a y axis is performed by a transferred driving force, other operations of 2 degrees of freedom may be performed by an activity of a user with no driving force. Meanwhile, in the embodiment, all operations of 3 degrees of freedom may be performed by a transferred driving force. The first frame 10 may be pivoted based on the y axis by pulling or releasing a wire 11. The wire 11 may be wound on a pulley 12 connected to a driving source, such as a motor, and the wire 11 may be connected to the first frame 10 using the hip joint 30. As an example, when the driving source rotates the pulley 12 to wind the wire 11 on the pulley 12, the first frame 10 may be pivoted based on the y axis. When the driving source rotates the pulley 12 to release the wire 11 from the pulley 12, the first frame 10 may be pivoted based on the y axis in a reverse direction of the above.

Further, the second frame 20 may be pivoted to have 1 degree of freedom with respect to the first frame 10. The second frame 20 which may be pivotally connected to the first frame 10 using the knee joint 50 may be pivoted by pulling or releasing a wire 14. The wire 14 may be wound on a pulley 13 connected to the driving source, such as a motor, and the wire 14 may be connected to the second frame 20 using the knee joint 50.

As an example, when the driving source rotates the pulley 13 to wind the wire 14 on the pulley 13, the second frame 20 may be pivoted based on the y axis. When the driving source rotates the pulley 13 to release the wire 14 from the pulley 13, the second frame 20 may be pivoted based on the y axis in a reverse direction of the above.

Further, the foot structure 60 may be pivoted to have 3 degrees of freedom with respect to the second frame 20. The foot structure 60 and the second frame 20 may be pivotally connected by the ankle joint 70. The foot structure 60 or the second frame 20 may be pivoted about the ankle joint 70 according to an activity of the user with no driving force. The foot structure 60 or the second frame 20 may be pivoted about the ankle joint 70 by a driving force transferred by the driving source, such as a motor.

Further, the foot structure 60 may be provided to have 1 degree of freedom about a passive joint. The passive joint may be positioned at a bottom part of the foot structure 60, and refers to a degree of freedom in which the passive joint is passively moved by an activity of the user. The passive joint may be provided for the user to have a natural walking posture, but may be omitted in some cases.

A first fixing part 90 may be connected to the first frame 10. The first fixing part 90 may enclose the thigh of the user and mount the first frame 10 on the thigh of the user. A second fixing part 91 may be connected to the second frame 20. The second fixing part 91 may enclose the calf of the user and mount the second frame 20 on the calf of the user.

When the user wears the wearable robot device 100, the first frame 10 or the second frame 20 may be provided to extend in a longitudinal direction of the leg of the user. The first frame 10 or the second frame 20 may be provided by connecting a plurality of links. The plurality of links may be made of a rigid material. The first frame 10 or the second frame 20 may be pivotally connected by the plurality of links and may not only be flexibly bent along body lines of the user but also stably support the weight of the user.

Meanwhile, the configuration of the wearable robot device 100 capable of being worn on the lower body of the user is described as an example in FIG. 1, but the form of the wearable robot device 100 is not limited thereto and it should be understood that those of ordinary skilled in the art can easily consider changes that remain within the scope of the present disclosure.

Hereinafter, a configuration of the wearable robot device 100 according to one embodiment of the present disclosure will be described in detail with reference to FIG. 3.

Figure 3:
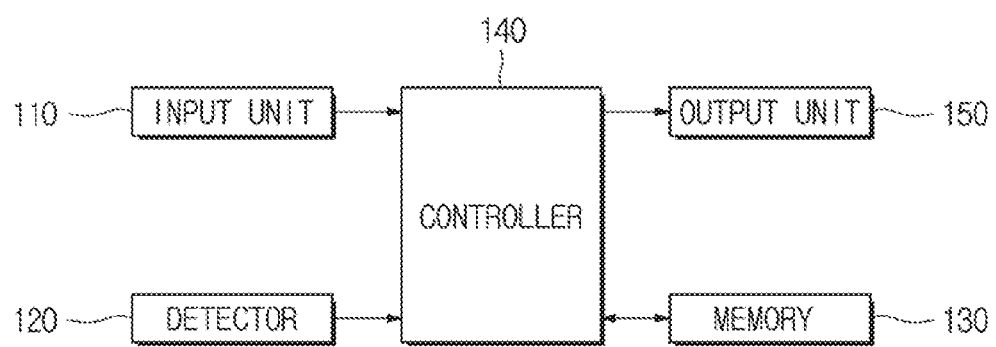
FIG. 3 is a view illustrating a control block diagram of the wearable robot device according to one embodiment of the present disclosure.

FIG. 3 is a view illustrating a control block diagram of the wearable robot device 100 according to one embodiment of the present disclosure.

Referring to FIG. 3, the wearable robot device 100 according to one embodiment of the present disclosure may include an input unit 110, a detector 120, a memory 130, a controller 140 and an output unit 150.

The input unit 110 may receive a control command of a user for the wearable robot device 100. The user may set a mode of the wearable robot device 100 using the input unit 110. The wearable robot device 100 may operate in a plurality of modes including a first mode and a second mode according to the setting of the user.

According to an example, the first and the second modes may include at least one of a rehabilitation mode and a power assist mode of the wearable robot device 100. Hereinafter, the rehabilitation mode may be defined as a mode provided when the activity of a rehabilitation patient is assisted, and the power assist mode may be defined as a mode provided when the activity of a worker is assisted during the execution of a process. Meanwhile, an example of the operation mode of the wearable robot device 100 is not limited thereto and may be variously changed according to the intention of a designer.

The input unit 110 may include hardware input devices, such as various kinds of buttons, switches, a keyboard, a mouse, a track-ball etc., for the input of the user, and some embodiments may include software input devices, that is, a graphic user interface (GUI) such as a touch pad, etc. When the input unit 110 is provided in the form of a touch pad, the touch pad may be implemented as a touch screen panel (TSP) to form a mutual layer structure with a display.

The detector 120 may be provided in the foot structure 60 of the wearable robot device 100 to collect information on a force applied from the user and to transmit the collected information on the force to the controller 140. The detector 120 may include a force sensor to collect information on a force applied from the user. However, a sensor capable of being applied as the detector 120 is not limited to the above.

The detector 120 may be mounted on the foot structure 60 of the wearable robot device 100. However, the mounted position of the detector 120 is not limited to the above. The detector 120 may be mounted on an end point of the wearable robot device 100 including the knee joint 50 connecting the first frame 10 and the second frame 20.

The memory 130 may store a control program or an application for driving and controlling the wearable robot device 100. More particularly, the memory 130 may store a program for determining a required amount of torque necessary for an operation of the wearable robot device 100 based on the collected information with the detector 120 and a sound corresponding to the required amount of torque.

Further, the memory 130 may store information on a target value of a force according to the operation mode of the wearable robot device 100. Hereinafter, the target value of the force may refer to a value of a desired force which is output by an operation mode of the wearable robot device 100. As an example of the target value of the force, force information of an ordinary person in each mode is obtained to build back data in advance, and the target value of the force may be set based on the stored back data. However, the method of setting the target value of the force is not limited to the above, and may be arbitrarily determined by the user.

Meanwhile, information on the target value of the force may be differently set according to an operation mode of the wearable robot device 100. For example, when the user needs to be assisted by a more powerful force in a second operation mode compared to a first operation mode, the target value of the force in the second operation mode may be set higher compared to a setting of the first operation mode.

The memory 130 may store sound information according to the operation mode of the wearable robot device 100. In particular, the memory 130 may store information on a frequency, strength and a tone of a sound according to the operation mode of the wearable robot device 100.

As an example, the memory 130 may store information on a sound of a first frequency band when the wearable robot device 100 operates in the first operation mode, and information on a sound of a second frequency band when the wearable robot device 100 operates in the second operation mode.

The memory 130 may store information on a sound according to a required amount of torque determined in the controller 140. In particular, the memory 130 may store information on a frequency, strength and tone of a sound according to the required amount of torque which is determined in the controller 140.

The memory 130 may include at least one type of a storage medium among a flash memory, a hard disk type memory, a multimedia card micro type memory, a card type memory (for example, a secure digital (SD) or an extreme digital (XD) memory), a dynamic random access memory (DRAM), a static random access memory (SRAM), a read-only memory (ROM), an electrically erasable programmable ROM (EEPROM), a programmable ROM (PROM), a magnetic memory, a magnetic disk, an optical disk, etc.

The controller 140 may control overall operations of the wearable robot device 100. The controller 140 may control each component of the wearable robot device 100 including the input unit 110, the detector 120, the memory 130, the output unit 150, etc. The controller 140 may be various kinds of processors which include at least one chip in which an integrated circuit is formed.

The controller 140 may determine a required amount of torque necessary for an operation of the wearable robot device 100 based on information collected with the detector 120, and may determine a sound corresponding to the required amount of torque, more particularly, a frequency, strength, and a tone of the sound.

A frequency, strength, and a tone of a sound are typical elements which refer to characteristics of the sound, the frequency of the sound refers to high or low pitch of the sound, the strength of the sound refers to an intensity of the sound (that is, an energy of the sound), and the tone of the sound refers to the form of the sound (that is, a spectrum of the sound).

As an example, the sound may include a mechanical sound, a footstep sound, and the like which are generated while operating the wearable robot device 100, and may also include a pre-stored human sound (for example, a groan) in some embodiments.

Hereafter, for convenience of description, a process in which the controller 140 determines a frequency of a sound will be described in detail. In some embodiments, a process of determining strength and a tone of a sound may also be the same as the process of determining the frequency of the sound. Hereinafter, in the process of determining the strength and tone of the sound, repeated descriptions of determining the frequency of the sound will be omitted.

The controller 140 may differently determine a frequency band of a sound output from the output unit 150 according to the operation mode of the wearable robot device 100.

Figure 4:
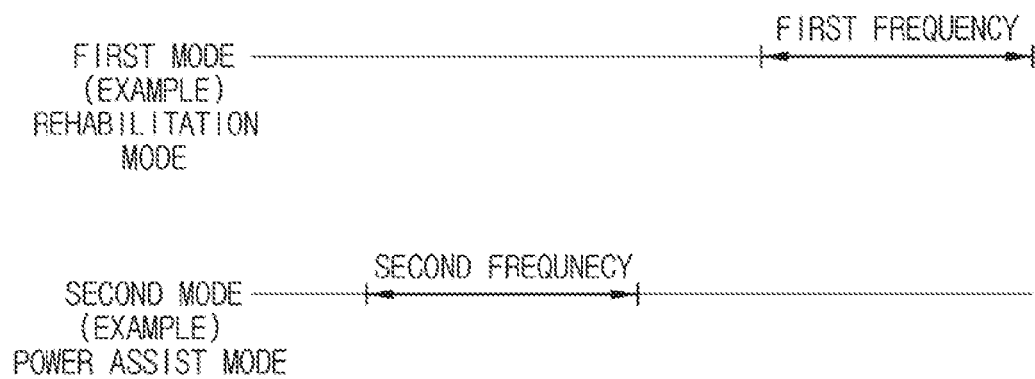
FIG. 4 is a view illustrating an example in which a frequency band of an output sound is determined according to an operation mode of the wearable robot device.

FIG. 4 is a view illustrating an example in which a frequency band of an output sound is determined according to an operation mode of the wearable robot device. Hereinafter, for convenience of description, a case in which the wearable robot device 100 operates in a rehabilitation mode or a power assist mode will be described as an example.

Referring to FIG. 4, when the wearable robot device 100 operates in the rehabilitation mode, the frequency band of the sound output from the output unit 150 may be determined as a first frequency band, and when the wearable robot device 100 operates in the power assist mode, the frequency band of the sound output from the output unit 150 may be determined as a second frequency band.

Generally, since the power assist mode may assist a more powerful force to the user than the rehabilitation mode, the frequency band of the sound output from the rehabilitation mode may be higher than that of the sound output from the power assist mode. As a result, a brighter and clearer sound may be output in the rehabilitation mode as compared to that output in the power assist mode.

Further, the controller 140 may determine the required amount of torque necessary for an operation of the wearable robot device 100 based on information on the target value of a force stored in the memory 130 and the force information of the user collected by the detector 120. Here, the target value of the force may refer to a value determined according to the operation mode of the wearable robot device 100, and the required amount of torque necessary for the operation of the wearable robot device 100 may be differently determined according to the operation mode of the wearable robot device 100.

The method of calculating the required amount of torque necessary for the operation of the wearable robot device 100 may be represented as the following Equation 1.

$$Frob = Fref - Fact \quad \text{Equation 1}$$

Here, Frob refers to a required amount of torque necessary for the operation of the wearable robot device 100, Fref refers to a target value of a force stored in the memory 130, and Fact refers to force information of the user collected by the detector 120.

The controller 140 may determine a frequency of a sound output from the output unit 150 according to the required amount of torque.

Figure 5:
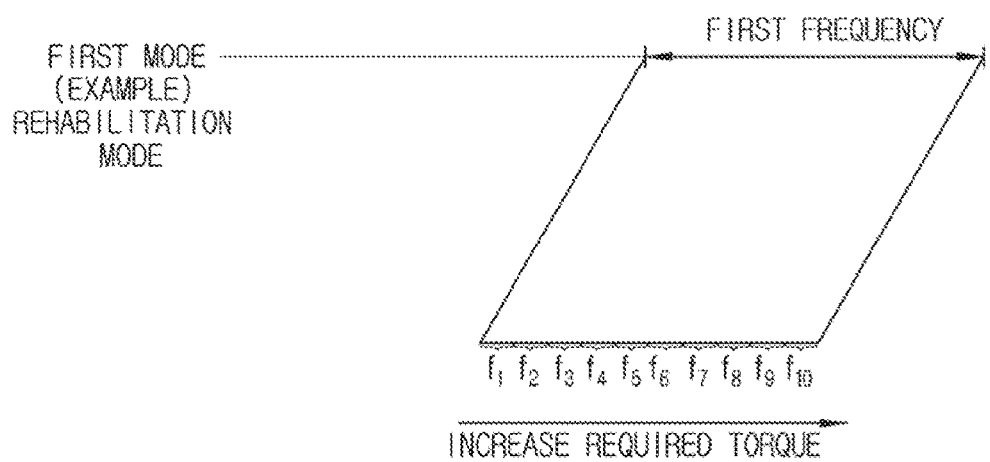
FIG. 5 is a view illustrating an example in which a frequency band of a sound is determined according to a required amount of torque of the wearable robot device in a single operating mode.

FIG. 5 is a view illustrating an example in which a frequency band of a sound is determined according to a required amount of torque of the wearable robot device 100. Hereinafter, in the rehabilitation mode as an example, it will be described that the frequency band of the sound may be determined according to the required amount of torque of the wearable robot device 100.

Referring to FIG. 5, a first frequency band corresponding to the rehabilitation mode may be divided into a plurality of sections according to the required amount of torque necessary for the operation of the wearable robot device 100.

For example, the required amount of torque necessary for the operation of the wearable robot device 100 may be divided into 10 operations, and thus the first frequency band corresponding to the rehabilitation mode may be divided into 10 sections including f1 to f10. In the embodiment, the required amount of torque may be increased from a first operation to a tenth operation as the required amount of torque is increased, and the frequency of the sound corresponding to the required amount of torque may be determined from f1 to f10.

Meanwhile, a range of the required amount of torque necessary for the operation of the wearable robot device 100 may be arbitrarily set by the user based on an output torque of the wearable robot device 100. For example, the required amount of torque necessary for the operation of the wearable robot device 100 may be set in the range of a first torque and a second torque, and the set range of the amount of torque may vary with the manipulation of the user.

In FIG. 5, the rehabilitation mode is described as an example for convenience of description, but the method of determining a sound output from the power assist mode may be the same as the rehabilitation mode.

The output unit 150 may output a sound determined by the controller 140. In detail, the output unit 150 may output a sound having a different frequency, strength, and tone depending on a required amount of torque determined by the operation mode of the wearable robot device 100 and the controller 140.

As an example, the output unit 150 may output a sound having a different frequency band according to the operation mode of the wearable robot device 100. The range of the frequency of the sound output from the output unit 150 may be in the range of about 1 to 6 kHz, that is, a frequency range that is easily audible to a person.

For example, when the wearable robot device 100 operates in the first operation mode, the output unit 150 may output a preset sound of a first frequency band, and when the wearable robot device 100 is operated in the second operation mode, the output unit 150 may output a preset sound of a second frequency band.

Further, the output unit 150 may output a sound having a different frequency according to a required amount of torque determined by the controller 140.

As described above, the required amount of torque necessary for the operation of the wearable robot device 100 may be divided into 10 operations, and thus the first frequency band corresponding to the rehabilitation mode may be divided into 10 sections including f1 to f10. In the embodiment, the required amount of torque may be increased from a first operation to a tenth operation as the required amount of torque is increased, and thus the frequency of the sound output from the output unit 150 may be increased from f1 to f10.

Further, the output unit 150 may output an alarm sound according to an output limit of the required amount of torque. As an example, when the size of the required amount of torque corresponds to the tenth operation, the output unit 150 may output a predetermined alarm sound and thus provide an alarm for a recommendation of stopping the use of the wearable robot device 100.

Such an output unit 150 may include a speaker. However, an example of the output unit 150 is not limited thereto and all configurations capable of providing an audible display may be included in a scope which those of ordinary skilled in the art may easily consider.

As described above, the wearable robot device 100 according to one embodiment is described.

In the wearable robot device 100 according to one embodiment, the operation mode of the wearable robot device 100 may be selected according to the intention of the user, and a sound of a different frequency band may be output according to the operation mode of the wearable robot device 100.

In detail, when the rehabilitation mode of the wearable robot device 100 is selected, a sound effect at a high frequency may be provided so that the user feels the device is light and speedy, and thus a rehabilitation treatment may be assisted by stimulating the psychological factor and experience of the user. Conversely, when the power assist mode of the wearable robot device 100 is selected, a sound effect at a low frequency may be provided so that the user feels the device is heavy in a physical work site. Therefore, information on a current state may be audibly informed to the user, and as a result, the user may be supported to work by feedback or psychological factors.

Next, an example of a method for controlling the wearable robot device 100 will be described.

Figure 6:
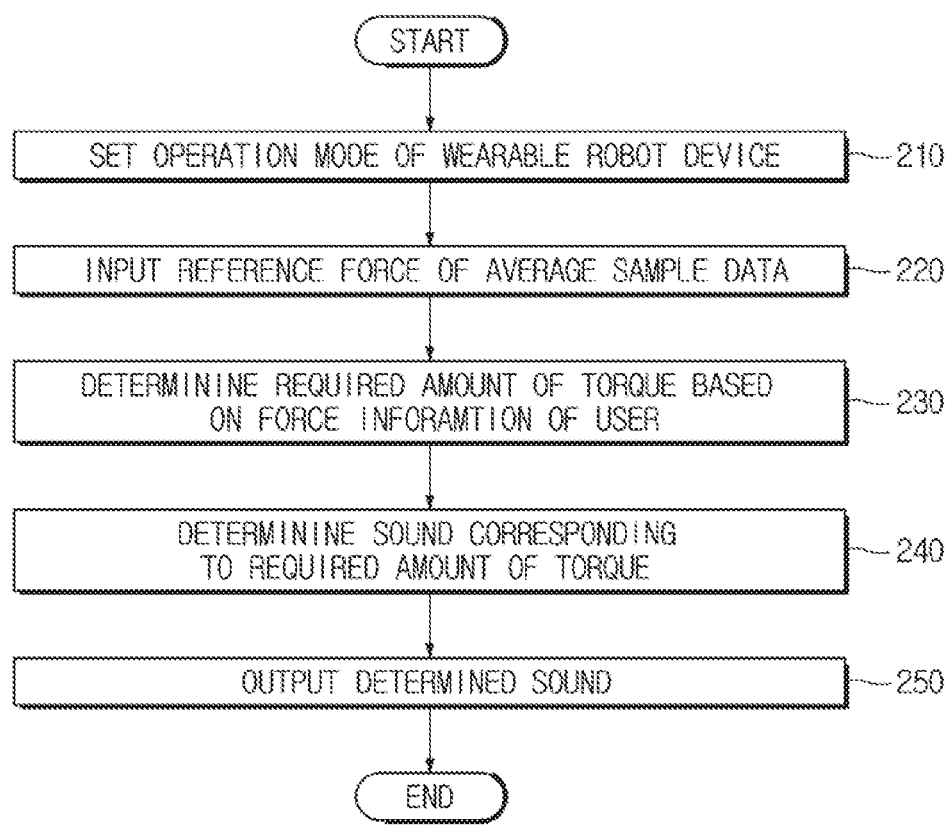
FIG. 6 is a flowchart illustrating a control process of the wearable robot device according to one embodiment of the present disclosure.

FIG. 6 is a flowchart illustrating a process of controlling the wearable robot device 100 according to one embodiment of the present disclosure.

Referring to FIG. 6, a control method of the wearable robot device 100 according to one embodiment may include inputting reference force of average sample data (S220), determining a required amount of torque necessary for an operation of the wearable robot device 100 based on the force information (S230), determining the frequency of a sound corresponding to the required amount of torque (S240) and outputting a sound corresponding to the determined frequency (S250).

Meanwhile, when the wearable robot device 100 according to one embodiment is able to operate in a plurality of modes, a process of setting an operation mode of the wearable robot device 100 may be included (S210). The operation mode of the wearable robot device 100 may include the rehabilitation mode and the power assist mode, but examples of the operation modes are not limited thereto.

When the operation mode of the wearable robot device 100 is set, the inputting reference force of average sample data may be performed with the detector 120. The inputting reference force of average sample data may include collecting force information of the user through a force sensor (S220).

When the force information on the user is collected, the determining of the required amount of torque necessary for the operation of the wearable robot device 100 may be performed based on the force information. The determining of the required amount of torque necessary for the operation of the wearable robot device 100 may include determining a required amount of torque necessary for work based on a difference between the target value of a force stored in the memory 130 and the collected force information of the user (S230).

When the required amount of torque necessary for the operation of the wearable robot device 100 is determined, the wearable robot device 100 may operate based on the determined amount of torque, and the outputting of the sound corresponding to the operation of the wearable robot device 100 may be performed simultaneously.

In more detail, the outputting of the sound corresponding to the operation of the wearable robot device 100 may include determining a sound frequency corresponding to the required amount of torque (S240) and outputting the sound corresponding to the determined frequency (S250).

When the sound frequency corresponding to the required amount of torque is determined, the sound frequency may be differently determined according to the required amount of torque. Repeated descriptions will be omitted below.

Further, when a sound corresponding to the determined frequency is output, a sound of the different frequency may be output according to the required amount of torque. Repeated descriptions will be omitted below.

As is apparent from the above description, since the wearable robot device and the control method thereof according to the present disclosure provide an audible display according to an operation of the wearable robot device, a user of the wearable robot device can decrease an action of checking a visual display while still maintaining device operability. In particular, the wearable robot device can output a bright and high sound effect in the case of the rehabilitation mode and output a heavy and low sound effect in the case of the power assist mode.

Further, accidents can be prevented by notification of an operational state of the wearable robot device to its surroundings.

As described above, the wearable robot device and the control method thereof are described in detail. Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A wearable robot device comprising
   a frame;
   a detector provided on the frame for collecting information on a force applied from a user;
   a controller for determining a required amount of torque necessary for an operation of the wearable robot device based on the information collected by the detector, and for determining a sound corresponding to the required amount of torque; and
   an output device for outputting the determined sound,
   wherein the wearable robot device further comprises:
     an input device for receiving the plurality of operation modes of the wearable robot device; and
     a memory in which information on a target value of a force according to each of the plurality of operation modes of the wearable robot device is stored, and
   wherein the controller determines the required amount of torque necessary for the operation of the wearable robot device based on a difference between the information on the target value of the force stored in the memory and the information on the force of the user collected with the detector, and determines a frequency, strength and tone of the sound according to the determined required amount of torque.

2. The device of claim 1, wherein the controller determines a frequency, strength and tone of the sound according to the determined required amount of torque.

3. The device of claim 1, wherein the output device outputs a sound having a different frequency, strength and tone according to the determined required amount of torque.

4. The device of claim 1, wherein the output device outputs a preset sound in a first frequency band when the wearable robot device operates in a first operation mode, and outputs a preset sound in a second frequency band when the wearable robot device operates in a second operation mode.

5. The device of claim 1, wherein the memory stores information on a frequency, strength and tone of the sound which is output from the output device according to the required amount of torque.

6. The device of claim 1, wherein the detector is provided at an end point of the wearable robot device.

7. The device of claim 1, wherein the detector includes a force sensor to collect the information on the force of the user.

8. A method of controlling a wearable robot device, comprising steps for:
- collecting force information of a user with a detector;
- determining a required amount of torque necessary for an operation of the wearable robot device based on the force information by a controller;
- determining a sound corresponding to the required amount of torque by a controller; and
- outputting the determined sound by an output device,
- wherein the method further comprises setting the plurality of operation modes of the wearable robot device by the controller,
- wherein the step for determining the required amount of torque necessary for the operation of the wearable robot device includes determining a required amount of torque necessary for the operation of the wearable robot device based on a difference between information on a target value of a force stored in a memory and the force information of the user collected with the detector, and
- wherein the step for determining the sound corresponding to the required amount of torque includes determining a frequency, strength and tone of the sound according to the required amount of torque.

9. The method of claim 8, wherein the step for determining the sound corresponding to the determined required amount of torque includes determining a frequency, strength and tone of the sound according to the determined required amount of torque.

10. The method of claim 8, wherein the step for outputting the determined sound includes outputting a sound having a different frequency, strength and tone according to the determined required amount of torque.

11. The method of claim 8, wherein the step for outputting the determined sound includes outputting a preset sound in a first frequency band when the wearable robot device operates in a first operation mode and outputting a preset sound in a second frequency band when the wearable robot device operates in a second operation mode.

* * * * *